(12) United States Patent
Wädt

(10) Patent No.: US 6,857,121 B1
(45) Date of Patent: Feb. 15, 2005

(54) RESPONSIVE SYSTEM FOR DIGITAL SIGNAL PROCESSING AND METHOD FOR OPERATION OF A RESPONSIVE SYSTEM

(75) Inventor: Karl Wädt, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/541,722

(22) Filed: Apr. 3, 2000

Related U.S. Application Data

(63) Continuation of application No. PCT/EP98/06003, filed on Sep. 21, 1998.

(51) Int. Cl.[7] .................................................. G06F 9/44
(52) U.S. Cl. ........................ 717/170; 717/122; 717/168; 717/171
(58) Field of Search ......................... 717/122, 168–173, 717/174; 340/5.91; 705/27, 39; 709/201, 221, 220; 713/201, 200, 324; 707/201, 11, 200

(56) References Cited

U.S. PATENT DOCUMENTS

| 4,558,413 | A | * | 12/1985 | Schmidt et al. | .............. | 707/203 |
|---|---|---|---|---|---|---|
| 5,421,017 | A | | 5/1995 | Scholz et al. | ................ | 717/170 |
| 5,619,716 | A | * | 4/1997 | Nonaka et al. | .............. | 717/167 |
| 5,666,293 | A | * | 9/1997 | Metz et al. | ................. | 709/220 |
| 5,682,533 | A | * | 10/1997 | Siljestroemer | ............... | 707/200 |
| 5,706,510 | A | * | 1/1998 | Burgoon | ...................... | 707/203 |
| 5,832,269 | A | | 11/1998 | Döllinger et al. | ........... | 717/107 |
| 6,009,274 | A | * | 12/1999 | Fletcher et al. | .............. | 717/173 |
| 6,381,741 | B1 | * | 4/2002 | Shaw | ......................... | 717/168 |
| 6,658,330 | B2 | * | 12/2003 | Delaruelle | .................... | 701/19 |

FOREIGN PATENT DOCUMENTS

| EP | 0217351 A2 | 4/1987 |
|---|---|---|
| EP | 0498130 A2 | 8/1992 |

OTHER PUBLICATIONS

Literal translation of previously filed German Patent DE 44 46 286 C1, dated Jun. 20, 1996.

\* cited by examiner

*Primary Examiner*—Kakali Chaki
*Assistant Examiner*—William H. Wood
(74) *Attorney, Agent, or Firm*—Laurence A. Greenberg; Werner H. Stemer; Gregory L. Mayback

(57) ABSTRACT

A responsive system for digital signal processing and a method for operation of the responsive system implement computer programs, which are dependent on a respective update status, in data processing units that communicate with one another through a data transmission unit, in order to make the responsive system particularly reliable, even when subject to frequent revision. During each communication, each data processing unit assigns a revision identity characterizing its update status to a signal produced by it. A data processing unit receiving the signal carries out a comparison to determine if the revision identity characterizing the signal matches a revision identity stored for that signal and, if the revision identities match, the signal is processed.

15 Claims, 1 Drawing Sheet

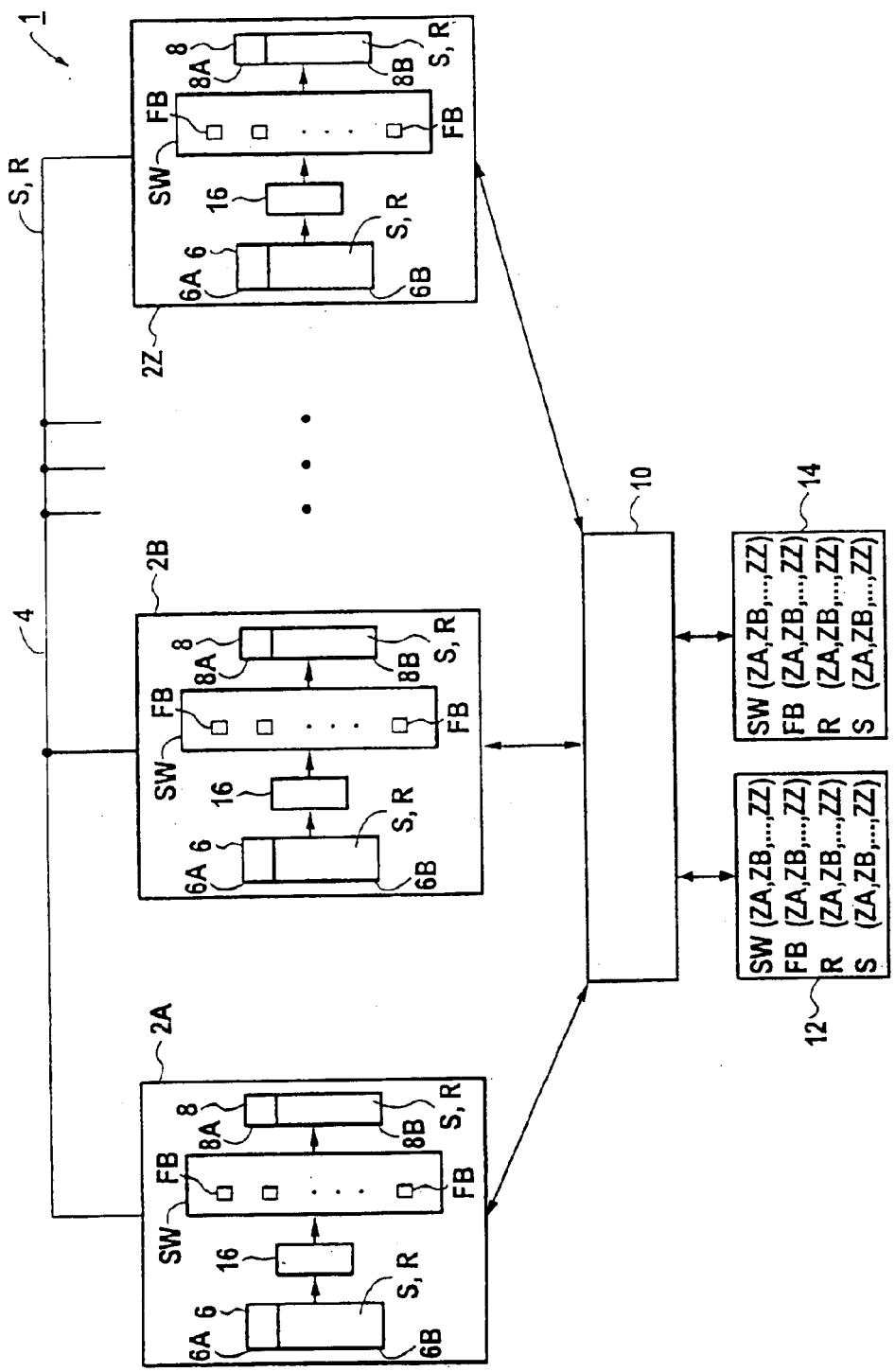

RESPONSIVE SYSTEM FOR DIGITAL SIGNAL PROCESSING AND METHOD FOR OPERATION OF A RESPONSIVE SYSTEM

CROSS-REFERENCE TO RELATED APPLICATION

This application is a continuation of copending International Application No. PCT/EP98/06003, filed Sep. 21, 1998, which designated the United States.

BACKGROUND OF THE INVENTION

Field of the Invention

The invention relates to a responsive system for signal processing having a plurality of data processing units which are connected to one another through a data transmission unit and on which computer programs are implemented. The invention furthermore relates to a method for operation of a responsive system.

Responsive systems, that is to say fault-tolerant systems and systems which can operate in real time, for signal processing, are widely used in industrial automation processes. Such a responsive system is known from German Patent DE 44 46 286 C1. The responsive system includes a plurality of data processing units, which communicate with one another through data transmission units. An associated update status is stored for each of the computer programs implemented on the data processing units.

A responsive system is particularly important in an automation process in which it is necessary to comply with predetermined time limits, or to produce output signals within predetermined time intervals. Such requirements frequently occur in manufacturing processes, regulation and control processes and monitoring processes, for example in the safety control system for a nuclear power station. Compliance with time limits or time intervals is critically dependent on the individual equipment-specific and program-specific components being suitable for their function.

In a complex system, in which a plurality of data processing units are connected to one another to form a large data network, faults in the program-specific components, in particular faults in a computer program, are of particular importance. Those faults, so-called software faults, may amount to up to 60% of the total number of system faults. In that case, the faults can be split into three groups. So-called specification faults are the most common, representing 55%. Maintenance faults have a proportion of approximately 25% and are approximately equally as important as implementation faults, which make up approximately 20%.

A specification fault occurs, for example, when a signal which is processed in the respective computer programs of different data processing units is deleted or newly added during a revision or modification of a specification on which the responsive system is based, with the deletion or the addition of that signal not being implemented at the same time on all of the data processing units. In other words, a newly added signal or a signal which is omitted during a revision leads to modifications not only to the computer programs of the respective related data processing units, but also to an modifications to the structure or the layout of messages which have to be transmitted between different data processing units and transmit the new signal. In that case, if all of the relevant data processing units are not updated at the same time, it is possible for incompatibilities to occur between them. That can lead to a time overrun occurring during the execution of computer programs which have not yet been modified. Such a time overrun causes that data processing unit to fail.

SUMMARY OF THE INVENTION

It is accordingly an object of the invention to provide a responsive system for signal processing, in particular for digital signal processing, which is particularly reliable even when subject to frequent revision, and thus allows consistent operation of a computer program integrated in the responsive system, as well as a method for consistent operation of the responsive system for signal processing, which overcome the hereinafore-mentioned disadvantages of the heretofore-known systems and methods of this general type.

With the foregoing and other objects in view there is provided, in accordance with the invention, a responsive system for signal processing, comprising a data transmission unit; and a plurality of data processing units communicating CIO with one another through the data transmission unit, the data processing units implementing at least one computer program dependent on a respective update status; each of the data processing units, during each communication, assigning a revision identity characterizing its update status to a signal produced by the data processing unit; one of the data processing units receiving the signal, performing a comparison to determine if the revision identity characterizing the received signal matches a revision identity stored for that signal; and the data processing unit receiving the signal performing regular processing of the signal if the received revision identity matches the stored revision identity and otherwise not performing regular processing of the signal.

In this case the invention is based on the concept that, even when a modification is made to an individual computer program, there is an objective of reliably avoiding disconnection or failure of a responsive system which includes a number of data processing units and which is used, for example, in the safety control system of a pressurized-water reactor. Particularly in a safety control system in which the data processing units may have a redundant structure, it is possible, during a revision of the computer programs (so-called specification modification) for the updating of the relevant data processing units to be carried out at different times. This normally leads to incompatibility between these data processing units. The responsive system should thus also be insensitive to modifications to only one data processing unit.

In other words: modifications to the computer program or to the software, for example the deletion of signals or the addition of new signals, should initially be possible only in one data processing unit. The messages which contain the transmitted signals have appropriate status information or an update status for this purpose. The compatibility of the receiving data processing unit with the received signal is determined by comparing this update status with the update status stored in the receiving data processing unit, in order to determine whether the signal relates to the same specification, or to a modified specification. If the specifications match, an appropriate status information item may be set, such as "Status OK". If they do not match, the status information item "Status Error" may be set in a corresponding manner.

In accordance with another feature of the invention, each data processing unit includes an analysis module for carrying out the comparison.

In accordance with a further feature of the invention, in order to carry out the comparison, the responsive system expediently includes a first database in which the respective update status of the signals and/or the computer programs is stored, and a second database in which future modifications or revisions of respective signals to be modified and/or to respective computer programs to be modified are stored.

In accordance with an added feature of the invention, there is provided a service system for updating the computer programs and/or the signals of the data processing units and, in consequence, also for monitoring the consistency of all data processing units.

With the objects of the invention in view, there is also provided a method for consistent operation of a responsive system for digital signal processing, which comprises providing a data transmission unit; providing a plurality of data processing units communicating with one another through the data transmission unit; implementing at least one computer program depending on a respective update status in the data processing units; producing a signal with one of the data processing units, and assigning a revision identity to the signal characterizing an update status of the signal, for each communication; carrying out a comparison in one of the data processing units receiving a signal to determine if the revision identity characterizing the received signal matches a revision identity stored for that signal; and carrying out regular processing of the signal if the revision identities match, and otherwise not carrying out the regular processing of the signal.

The signal is expediently interchanged in a data message between two processing units. In accordance with another mode of the invention, the stored revision identity is stored in an analysis module in the receiving data processing unit, and/or in a database. The comparison of the specifications is carried out by using this revision identity stored in the analysis module and/or in the database.

The data message preferably includes an information part and a signal part. For example, the information part of the data message includes information, in particular identification numbers, of the receiving and transmitting data processing units, as well as information relating to whether the transmitting data processing unit is in a test mode or in the normal mode. The signal part includes the signals to be processed in the receiving data processing unit, together with the respective revision identities characterizing them.

In accordance with a further mode of the invention, the revision identity characterizing the signal and the revision identity stored for the signal are expediently incremented by the value one for a revision or modification to the specification relating to this signal.

In accordance with a concomitant mode of the invention, if a signal is deleted or removed, the revision identity stored for this signal and the revision identity characterizing the signal are advantageously provided with a negative mathematical sign.

The advantages achieved by the invention are, in particular, that the comparison of the revision identity characterizing a received signal with the revision identity stored for this signal makes it possible for the receiving data processing unit to process only those signals which relate to one and the same specification. It is thus possible to detect the compatibility of the signals received from another data processing unit with the signals to be processed in the receiving data processing unit. This largely avoids data processing unit failures resulting from specification faults or maintenance faults. A responsive system of such a structure in which the method for consistent operation, in particular for consistent maintenance, is used, is thus particularly economical and effective with regard to its availability and with regard to its use as an automation system in a nuclear power station.

Other features which are considered as characteristic for the invention are set forth in the appended claims.

Although the invention is illustrated and described herein as embodied in a responsive system for digital signal processing as well as a method for operation of a responsive system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE of the drawing is a block diagram of an exemplary embodiment of a responsive system for digital signal processing.

DESCRIPTION OF THE PREFERRED EMBODIMENTS

Referring now in detail to the single FIGURE of the drawing, there is seen a responsive system 1 which includes a large number of data processing units 2A to 2Z that are connected to one another through a data transmission unit 4. The data transmission unit 4 is a standardized transmission line, for example an Ethernet coaxial cable, and has standardized non-illustrated transmission elements, such as amplifiers, repeaters or bridges. The data processing units 2A to 2Z are connected through the use of the data transmission unit 4 to in form a computer network. The responsive system 1 is suitable in particular for controlling and monitoring a technical system, in particular a nuclear power station.

Each data processing unit 2A to 2Z is suitable for processing two types of messages. One type is a received message 6, which is received in a data processing unit 2A from another data processing unit 2B. The other type is a transmitted message 8, which is transmitted or sent from a data processing unit 2A to another data processing unit 2B. In this case, each received message 6 and each transmitted message 8 has a respective message header 6A and 8A, and a respective signal part 6B and 8B.

During operation of the nuclear power station, large amounts of data, in the form of control commands and status messages as well as defect messages (which will be referred to below as signals S) are transmitted between the data processing units 2A to 2Z through the data transmission unit 4. In this case, the signals S are combined to form messages. If an update status of some of the data processing units 2A to 2Z differs, according to the prior art that could lead to incompatibilities between received signals S from another data processing unit 2A and the signals S to be processed by the receiving data processing unit 2B. That would lead to instabilities in the processing of the computer programs in the receiving data processing unit 2A, 2B. Those instabilities are reliably avoided by measures described in the following text.

Furthermore, each data processing unit 2A to 2Z is connected to a service system 10. The service system 10 monitors the message traffic between the data processing units 2A to 2Z.

At least one computer program SW is implemented on each data processing unit 2A to 2Z and is provided in a modular form from a number of functional modules FB. Any modification to the specification of the responsive system 1, for example signals S to be newly added or signals S to be deleted, is transmitted through the use of the service system 10 to the relevant data processing units 2A to 2Z. When such a modification to the specification occurs, on one hand, the functional modules FB on the relevant data processing units 2A to 2Z are modified and are thus matched. On the other hand, the structure or the layout of the relevant received messages 6 is as well as the relevant transmitted messages 8 is modified and thus matched with regard to the new signals S or the signals S to be deleted.

The responsive system 1 includes a first database 12 and a second database 14, which are each connected to the service system 10. The first database 12 contains the present specification or the respective update states of the computer programs SW, with the respective associated functional modules FB of all of the data processing units 2A to 2Z as well as the layout of the received messages 6 and of the transmitted messages 8 of all of the data processing units 2A to 2Z. Furthermore, the first database 12 in each case stores a revision identity R for each computer program SW and for each signal S of each received message 6 and of each transmitted message 8, as the update status.

The structure of the second database 14 is identical to that of the first database 12. The second database 14 likewise stores all of the computer programs SW as well as all of the signals S with the respective associated current revision identity R. Modifications to the specification or revisions of computer programs SW which now respectively need to be modified, and/or signals S to be modified are entered or recorded in the second database 14.

An integer is stored as a previous or current revision identity R, in both the first database 12 and the second database 14. For example, all of the signals S which are modified during a first modification to the specification, a so-called first revision, are given the revision identity R=+1. The signals S modified in the next specification modification are given the revision identity R=+2, that is to say a revision identity R incremented by the value 1. The signals S deleted in the second modification are given the revision identity R=−2, in which case the negative mathematical sign indicates that the signal S has been deleted. Signals S or computer programs SW to be newly added are attached to the end of the message and to the second database 14, in which case these signals S are given a positive revision identity R. An analogous procedure is used for every other specification modification or revision. That is to say, the number R=+4 or R=−4 is given to the modified signals S as the revision identity R for a fourth specification modification.

Once they have been entered in the second database 14 through the use of the service system 10, the specification modifications are transmitted to the relevant data processing units 2A to 2Z. A deleted signal S is not deleted in all of the received messages 6 and transmitted messages 8 until the computer program SW in all of the data processing units 2A to 2Z has been updated. This ensures that the modifications in the computer programs SW of all of the relevant data processing units 2A to 2Z have also actually been implemented., After the updating of all of the relevant data processing units 2A to 2Z, all of the relevant received messages 6 and all of the relevant transmitted messages 8 in accordance with the revision being carried out, the updated specification is transferred to the first database 12, through the use of the service system 10.

Subsequent specification modifications or revisions are once again firstly stored in the second database 14. In other words, if the contents of the first database 12 are identical to the contents of the second database 14, all of the data processing units 2A to 2Z are matched to the same specification.

In order to avoid a failure of a data processing unit 2A to 2Z which, for example, have not yet been updated, each data processing unit 2A to 2Z also includes an analysis module 16. During operation, the analysis module 16 checks the correctness of each signal S contained in the received message 6 from another data processing unit 2A to 2Z, using the revision identity R stored in the receiving data processing unit 2A to 2Z, and the associated current revision identity R. This check during operation is explained in more detail in the following text:

For checking purposes, the corresponding specification of the associated data processing unit 2A to 2Z, that is to say the previous revision identities R or the revision identities R on which a current change is based, of the respective computer programs SW and of the signals S, is stored in the respective analysis module 16. The data processing unit 2B, which transmits a transmitted message 8 to another data processing unit 2A, in each case assigns to each signal S being produced and to be transmitted the revision identity R characterizing its update status.

This transmitted message 8 is received by the other data processing unit 2A as the received message 6. The receiving data processing unit 2A then uses the analysis module 16 to compare for a match between the revision identity R characterizing the signal S, and the revision identity R stored for this signal S. If the received revision identity R matches the stored revision identity R', that is to say if the specifications of the two communicating data processing units 2A, 2B match, the signal S is given the status information item "Status=ok", and is passed on for signal processing in accordance with the computer program SW. If they do not match, the signal S is given the status information item "Status=Error", and is not processed.

The analysis module 16 is updated with regard to a new specification by the specification modification transmitted to the associated data processing unit 2A to 2Z through the use of the service system 10. In this case, the previous revision identities R (stored in the analysis module 16) of the signals S and/or of the computer programs SW are replaced by the current revision identities R.

The advantages achieved by the invention are, in particular, that consistent and transparent operation is ensured through the use of the comparison of the revision identities R, even after specification modifications in the individual data processing units 2A to 2Z. The responsive system 1 for digital signal processing is thus particularly suitable for incremental maintenance.

I claim:

1. A responsive system for digital processing comprising:
a data transmission unit; and
a plurality of data processing units communicating with one another through said data transmission unit via messages wherein each message comprises at least one signal, said data processing units implementing at least one computer program dependent on a respective update status, the system being configured as follows:

a) each of said data processing units, during each communication, assigning a revision identity to each signal within a message produced by said data processing unit to characterize said respective update status of said each signal;

b) one of said data processing units receiving the message performing a comparison to determine if the revision identity characterizing each signal within the received message matches a revision identity stored for that signal; and c) said one of said data processing units receiving the at least one message, performing said at least one computer program on a signal within the message upon matching the received revision identity with the stored revision identity and otherwise not performing said at least one computer program on the signal.

2. The responsive system according to claim 1, wherein each of said data processing units has an analysis module for carrying out the comparison.

3. The responsive system according to claim 1, including a first database storing the respective update status of at least one of the signals and the computer programs of all of said data processing units, and a second database storing at least one of future modifications or revisions of respective signals to be modified and respective computer programs to be modified.

4. The responsive system according to claim 1, including a service system for updating at least one of the computer programs and the signals of said data processing units.

5. A method for operation of a responsive system for digital signal processing, which comprises:

a) providing a data transmission unit;

b) providing a plurality of data processing units communicating with one another through the data transmission unit via messages wherein each message comprises at least one signal;

c) said data processing units implementing at least one computer program depending on a respective update status;

d) each of said data processing units, during each communication, assigning a revision identity to each signal within a message produced by said data processing unit to characterize said respective update status of said each signal;

e) carrying out a comparison in one of the data processing units receiving the message to determine if the revision identity characterizing each signal within the received message matches a revision identity stored for that signal; and f) said one of said data processing units receiving the at least one message, performing said at least one computer program on a signal within the message upon matching the received revision identity with the stored revision identity and otherwise not performing said at least one computer program on the signal.

6. The method according to claim 5, which further comprises storing the stored revision identity in an analysis module in the data processing unit receiving the message and in a database.

7. The method according to claim 6, which further comprises incrementing the revision identity characterizing the signal and the revision identity stored for the signal by a value of one for a revision relating to that signal.

8. The method according to claim 6, which further comprises providing the revision identity characterizing the signal, and the revision identity stored for the signal, with a negative mathematical sign when the signal is removed from the message.

9. The method according to claim 5, which further comprises storing the stored revision identity in a database.

10. The method according to claim 9, which further comprises incrementing the revision identity characterizing the signal and the revision identity stored for the signal by a value of one for a revision relating to that signal.

11. The method according to claim 9, which further comprises providing the revision identity characterizing the signal, and the revision identity stored for the signal, with a negative mathematical sign when the signal is removed from the message.

12. The method according to claim 5, which further comprises storing the stored revision identity in an analysis module in the data processing unit receiving the message.

13. The method according to claim 12, which further comprises incrementing the revision identity characterizing the signal and the revision identity stored for the signal by a value of one for a revision relating to the signal.

14. The method according to claim 12, which further comprises providing the revision identity characterizing the signal, and the revision stored for the signal, with a negative mathematical sign when the signal is removed from the message.

15. The method according to claim 5, wherein implementing at least one computer program depending on a respective update status includes processing the received signal if the revision identities of the received signal and stored signal match and otherwise not processing the received signal.

* * * * *

UNITED STATES PATENT AND TRADEMARK OFFICE
CERTIFICATE OF CORRECTION

PATENT NO. : 6,857,121 B1
APPLICATION NO. : 09/541722
DATED : February 15, 2005
INVENTOR(S) : Karl Waedt It is certified that error appears in the above-identified patent and that said Letters Patent is hereby corrected as shown below:

On the Title Page,
Item [30] should read as follows:

Oct. 2, 1997    (DE)    .......... 197 43 758

Signed and Sealed this

Fifth Day of September, 2006

JON W. DUDAS
*Director of the United States Patent and Trademark Office*